United States Patent Office 3,431,857
Patented Mar. 11, 1969

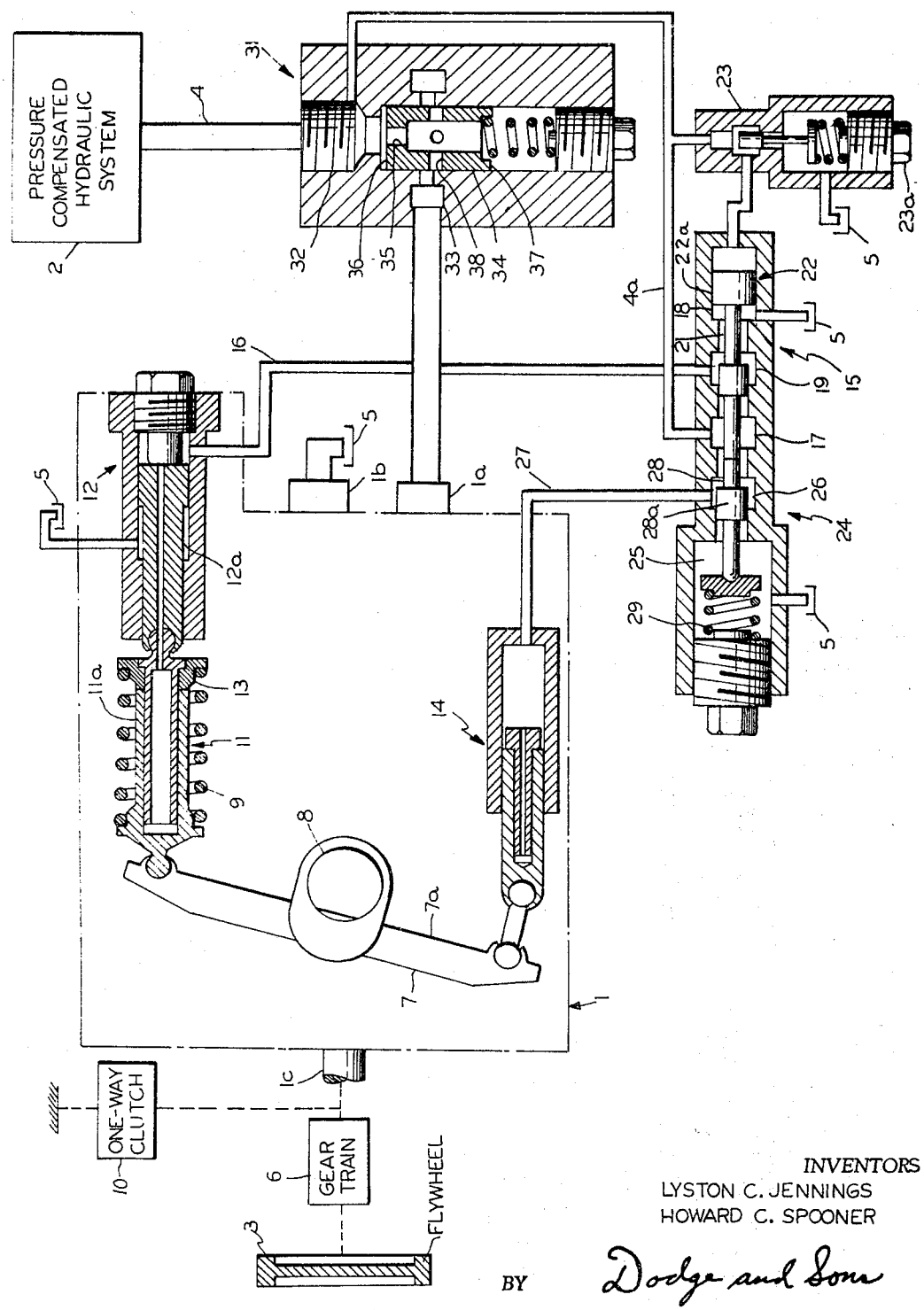

3,431,857
CONTROLS FOR OVERCENTER
MOTOR-PUMP UNIT
Lyston C. Jennings and Howard C. Spooner, Watertown,
N.Y., assignors to General Signal Corporation, a corporation of New Jersey
Filed Aug. 7, 1967, Ser. No. 658,918
U.S. Cl. 103—10    3 Claims
Int. Cl. F04b *49/08, 39/00*

ABSTRACT OF THE DISCLOSURE

A pressure compensated hydraulic power system having a flywheel energy storage device which, depending upon system pressure, either drives or is driven by an overcenter motor-pump unit. The high pressure port of the motor-pump unit is connected with the system through a one-way flow limiter, and its displacement control element is positioned by controls which respond to system pressure. At pressures above a prescribed level, the control element is held in the maximum displacement position at one side of the zero displacement position, and, at pressures below this level, the control element is shifted over center and is positioned as required to maintain system pressure constant.

Background and summary of the invention

This invention relates to hydraulic motor-pump units of the overcenter type, that is, units employing a control element which is shiftable between positions at opposite sides of a zero displacement position in order to change the rate and direction of flow through the unit.

One conventional hydraulic power system includes a pressure compensated pump which is driven by a prime mover, at least one hydraulic motor for driving a load, and a closed center control valve for selectively directing flow from the pump to the motor. In cases where the load is operated only infrequently, or the flow demand imposed on the pump varies over a wide range, it sometimes is advantageous, from the standpoint of cost or efficiency, to store energy supplied by the prime mover at times when the system is relatively inactive, and then use the energy to supply supplemental oil under pressure at times when the system is subjected to flow demands in excess of pump capacity. It has been proposed to store the energy in a flywheel which either drives or is driven by a motor-pump unit connected with the system, and the object of this invention is to provide a set of controls which automatically switches the unit between its pumping and motoring modes in accordance with the pressure in the system. At pressures above a predetermined value indicative of adequate pumping capacity, the controls hold the displacement control element of the motor-pump unit in one of its maximum displacement positions, and the unit, therefore, acts as a fixed displacement motor and delivers energy to the flywheel. On the other hand, when the system is called on to supply oil at a rate in excess of maximum pump output, and the pressure decreases below the prescribed value, the controls move the displacement control element over center to a pumping position. During this mode of operation, the unit acts as a variable delivery pump, and its output per revolution changes as required to maintain system pressure constant at a level close to, but slightly less than, said predetermined value. The components are so sized that the work cycle of the motor always will be complete before all of the energy in the flywheel is spent. Therefore, at the end of that cycle, system pressure will rise above the predetermined value, and the controls will automatically shift the displacement control element back to the maximum displacement motoring position.

Description of the preferred embodiment

The preferred embodiment of the invention is described herein with reference to the accompanying drawing which contains a schematic diagram of the novel controls and the other parts of the system with which they are associated.

As shown in the drawing, motor-pump unit 1 is arranged to transmit energy back and forth between a pressure compensated hydraulic system 2 and a flywheel 3. The unillustrated components of system 2 are conventional, and it will be understood that they include a reservoir, a pressure compensated pump, a closed center control valve, and a load-actuating motor. Motor-pump unit 1 is an overcenter, rotary cylinder barrel, longitudinally reciprocating piston unit of the type disclosed in U.S. Patent 3,234,889, and includes a high pressure port $1a$ which is connected with the high pressure portion of system 2 through system conduit 4, a low pressure port $1b$ which is in constant communication with a reservoir 5, and a rotary shaft $1c$ which is connected with flywheel 3 through a stepup gear train 6. The drive connection between shaft $1c$ and flywheel 3 is coupled to stationary structure through a one-way clutch 10 in order to insure unidirectional rotation of unit 1. The displacement of, and direction of flow through, unit 1 are controlled by a cam plate 7 which is mounted to pivot about the axis of trunnion 8 between maximum displacement positions at opposite sides of a netural, zero displacement position in which its active face $7a$ lies in a vertical plane.

Cam plate 7 is biased in the counterclockwise direction about the axis of trunnion 8 by means comprising coil compression spring 9 and a piston motor 11. Biasing means 9, 11 is carried by the piston $12a$ of a shifting motor 12 which serves to move it bodily from the illustrated motoring position, in which it urges cam plate 7 toward neutral position, to a pumping position, in which it urges the cam plate away from neutral position. When biasing means 9, 11 is in the pumping position, tubular piston $11a$ and spring seat 13 cooperate to define a stop that prevents cam plate 7 from moving in the clockwise direction beyond the neutral position. Cam plate 7 is pivoted in the clockwise direction against the opposition of spring 9 and motor 11 by a control motor 14.

Shifting motor 12 is selectively vented and pressurized by a motoring valve 15 with which it is connected by a conduit 16. This valve comprises inlet, exhaust and outlet chambers 17, 18 and 19 which are connected, respectively, with a branch $4a$ of system conduit 4, reservoir 5 and conduit 16, and a reciprocable valve spool 21. The valve spool is urged to the right to a supply position, in which it interconnects chambers 17 and 19, by the pressure in chamber 17 which acts upon its left end, and also by the force exerted by the biasing spring in the pilot valve described below. Valve spool 21 is shifted to the left to the illustrated vent position, in which it interconnects chambers 18 and 19 by a fluid pressure motor 22. A control valve 23, which responds to the pressure in branch conduit $4a$, connects motor 22 with this conduit or with reservoir 5 depending upon whether the pressure is above or below a predetermined value. This value is determined by the position of spring seat $23a$, and is so selected that valve 23 will open and pressurize motor 22 when the flow demand imposed on system 2 exceeds the maximum capacity of its pump.

A pilot valve 24 controls flow to and from control motor 14. This valve includes the inlet chamber 17 of motoring valve 15, exhaust and outlet chambers 25 and 26 which are connected, respectively, with reservoir 5 and with a conduit 27 leading to motor 14, and a reciprocable valve spool 28. This valve spool is aligned with the valve spool 21 of motoring valve 15 and is biased by a coil compression spring 29 toward a vent position in which it interconnects chambers 25 and 26. The pressure in inlet chamber 17 acts upon the right end of valve spool 28 and shifts it to the left, first to a lap position in which land 28a isolates chamber 26 from both of the chambers 17 and 25, and then to a supply position in which it interconects chambers 17 and 26. The piston 22a of motor 22 has a larger diameter than the bore which receives valve spool 21, and, therefore, when this motor is pressurized it exerts a force on valve spool 28 which augments the shifting force developed by the pressure in inlet chamber 17.

Interposed in the connection between high pressure port 1a and system conduit 4 is a one-way flow limiter 31 comprising an inlet chamber 32 connected with conduit 4, an outlet chamber 33 connected with port 1a, and a spring biased, tubular throttling member 34 containing a control orifice 35. Oil flowing from chamber 32 to outlet chamber 33 through orifice 35 creates a differential between the pressures acting on the upper and lower faces 36 and 37, respectively, of member 34. As the rate of flow increases, the pressure differential moves member 34 downward to throttle the flow through radial passages 38. This throttling action limits the rate at which fluid can be delivered to unit 1, and, since unit 1 is operated at a fixed displacement during the motoring operation, it prevents overspeeding of unit 1 and flywheel 3. During pumping operation, throttling member 34 assumes its uppermost position, so passages 38 are fully open and pressure losses are minimized.

In a typical installation, system 2 is compensated to a pressure of 3200 p.s.i., valve 23 is set to move to its supply position at a pressure of 3050 p.s.i., and spring 29 of pilot 24 is set so that a pressure of 3000 p.s.i. in chamber 17 is required to hold spool 28 in its lap position when motor 22 is vented. When system 2 is inactive, or is subjected to a flow demand which its pump can satisfy, the pressure in conduits 4 and 4a will be above 3050 p.s.i.; consequently, valve 23 will be in its supply position, motor 22 will be pressurized, and valve spools 21 and 28 will be in their illustrated vent and supply positions, respectively. Since motors 11 and 12 are vented, and control motor 14 is pressurized, cam plate 7 assumes the illustrated maximum displacement motoring position. Therefore, the oil delivered to high pressure port 1a through conduit 4 and flow limiter 31 will drive unit 1 as a motor and cause it to accelerate flywheel 3 to its rated speed. Inasmuch as motor 22 is now augmenting the pressure force acting directly on spool 28, and system pressure is above the 3000 p.s.i. setting of pilot valve 24, spool 28 will be held in its supply position, and motor 14 will keep cam plate 7 in its maximum displacement position. Therefore, since flow limiter 31 restricts the rate at which oil can be supplied to unit 1, the speed of unit 1 and flywheel 3 will be held to an acceptable value even if the flow capacity of the pump in system 2 is sufficient, as it usually is, to cause unit 1 to run at an excessive speed.

When the flow demand imposed on system 2 exceeds the capacity of its pump and system pressure drops below 3050 p.s.i., control valve 23 shifts upward to the position in which it vents motor 22 to reservoir 5. Now, the pressure in inlet chamber 17 shifts valve spool 21 to its supply position, and oil under system pressure is delivered to motors 11 and 12 through conduits 4 and 4a, chambers 17 and 19, and conduit 16. As a result, motor 12 will shift biasing means 9, 11 to its pumping position, and cam plate 7 will be moved in the counterclockwise direction at least as far as the neutral position. If the demand on system 2 reduces the pressure to a value between 3000 and 3050 p.s.i., the direct pressure force acting on valve spool 28 will be sufficient to hold the spool in the supply position even though motor 22 is vented, and therefore control motor 14 will hold cam plate 7 in the neutral position against the opposition of biasing means 9, 11. Consequently, unit 1 will neither discharge oil to nor draw fluid from system 2, but will simply rotate in an idle state under the action of flywheel 3. On the other hand, and in the more usual case, if the demand for hydraulic power reduces system pressure below the 3000 p.s.i. setting of pilot valve 24, spring 29 will shift valve spool 28 to its vent position, and biasing means 9, 11 will move cam plate 7 beyond the neutral position. Since the direction of rotation of unit 1 has not changed, it will now draw fluid from reservoir 5 through port 1b and deliver it under pressure to system 2 through port 1a, flow limiter 31, and system conduit 4. The oil discharged by unit 1 supplements that delivered by the pump in system 2, and, when the displacement of unit 1 has increased sufficiently to restore system pressure to the 3000 p.s.i. setting of pilot valve 24, valve spool 28 will be shifted to its lap position. This action hydraulically locks control motor 14 and prevents biasing means 9, 11 from moving cam plate 7 to a greater displacement position.

If the flow demand increases, system pressure will again decrease below 3000 p.s.i., spring 29 will move valve spool 28 to its vent position, and biasing means 9, 11 will move cam plate 7 in the counterclockwise direction until the change in the output rate of unit 1 restores the pressure to the desired value. At that time, valve spool 28 will be moved back to its lap position to thereby hydraulically lock control motor 14. On the other hand, if the demand for oil decreases, system pressure will rise above 3000 p.s.i. and shift valve spool 28 to its supply position. Now control motor 14 moves cam plate 7 in the clockwise direction to reduce the displacement of unit 1. When the decrease in displacement matches the decrease in the flow demand, and system pressure is restored to the 3000 p.s.i. level, valve spool 28 will move back to its lap position and again hydraulically lock control motor 14.

When the flow demand imposed on system 2 reduces below the level at which it can be satisfied by the pump, pilot valve 24 and control motor 14 will move cam plate 7 all the way to the neutral position, but this will not stem the rise in system pressure. As system pressure increases above the 3050 p.s.i. setting of control valve 23, this valve will shift to its supply position to pressurize motor 22 and cause the latter to move valve spool 21 to vent position. Now, motors 11 and 12 are connected with reservoir 5 through conduit 16 and chambers 19 and 18. Since valve spool 28 is in its supply position, and consequently control motor 14 is pressurized, cam plate 7 moves immediately over center (i.e., through neutral) to the illustrated maximum displacement position at the motoring side of neutral. Unit 1 now again acts as a motor and accelerates flywheel 3 to its rated speed.

When system 2 is shut down, and the pressure dissipates, the controls will automatically move cam plate 7 to a position at the pumping side of neutral and flywheel 3 will come to rest. When the system is subsequently activated, unit 1 will commence to develop torque before the pressure rises to the level at which the controls move cam plate 7 over center; consequently there is a short period of time during which unit 1 tends to drive flywheel 3 in a direction opposite to the one required for proper operation. If this reverse rotation were permitted to occur, the drive connection could be subjected to a very large torque load when the cam plate subsequently moves over center and changes the direction of rotation. This condition can be eliminated either by including mechanism for delaying the delivery of pressurized oil to port 1a until after the controls have moved cam plate 7 to the motoring side of neutral, or, as in the illustrated embodiment, by including a one-way clutch 10 that prevents reverse rotation of unit 1. The second alternative is preferred not only because it is simple, but also because it prevents malfunction in the event system 2 is subjected to unusually prolonged, large demands for fluid. While the components of the installation are so designed that the energy stored in flywheel 3 during a motoring cycle normally will not be spent completely during the next pumping cycle, abnormal conditions could extend the pumping cycle so that flywheel 3 comes to rest while cam plate 7 is at the pumping side of neutral. If unit 1 were free to rotate in both directions, it would now commence to act as a motor and drive flywheel 3 in the reverse direction. Once this happens, unit 1 would continuously extract oil from system 2 and proper operation would be prevented. In the case of the illustrated embodiment, clutch 10 prevents reverse rotation and therefore, if the length of a pumping cycle exceeds expectations, unit 1 will simply remain idle until system pressure is restored to the level at which the controls move cam plate 7 to the motoring side of neutral. At this time, normal operation will automatically resume.

We claim:
1. In combination
   (a) an overcenter, hydraulic motor-pump unit including high and low pressure ports and a control element movable between maximum displacement positions at opposite sides of a neutral, zero displacement position;
   (b) a reservoir connected with the low pressure port and a system conduit connected with the high pressure port;
   (c) means for limiting the rate of flow from the system conduit into the unit through the high pressure port;
   (d) biasing means acting on the control element;
   (e) a fluid pressure shifting motor for moving the biasing means from a first position, in which it urges the control element away from one maximum displacement position and toward the neutral position, to a second position in which it urges the control element away from the neutral position and toward the other maximum displacement position;
   (f) a fluid pressure control motor for shifting the control element in opposition to the biasing means;
   (g) a pilot valve responsive to the pressure in the system conduit and serving to connect the control motor with the system conduit and the reservoir, respectively, as the pressure rises above and falls below a predetermined value;
   (h) a motoring valve biased toward a supply position in which it connects the shifting motor with the system conduit and being shiftable to a vent position in which it connects the shifting motor with the reservoir;
   (i) fluid pressure motor means for shifting the motoring valve to the vent position and for urging the pilot valve to a position in which it connects the control motor with the system conduit; and
   (j) a control valve responsive to the pressure in the system conduit and serving to connect the fluid pressure motor means with the system conduit and the reservoir, respectively, as the pressure rises above and falls below a value greater than said predetermined value.

2. The combination defined in claim 1 in which the means for limiting rate of flow comprises a flow rate responsive throttling valve.

3. The combination defined in claim 1 in which
   (a) the pilot and motoring valves include valving spools which reciprocate in a common bore and are arranged to move into and out of abutment with each other; and
   (b) the fluid pressure motor means comprises a single fluid pressure motor which acts directly upon the valving spool of the motoring valve and indirectly, through that spool, upon the spool of the pilot valve.

References Cited
UNITED STATES PATENTS

| | | |
|---|---|---|
| 3,170,450 | 2/1965 | Kent et al. |
| 3,252,426 | 5/1966 | Parr. |
| 3,234,889 | 2/1966 | Cooper et al. |

WILLIAM L. FREEH, *Primary Examiner.*

U.S. Cl. X.R.

91—199; 103—38, 162

UNITED STATES PATENT OFFICE
CERTIFICATE OF CORRECTION

Patent No. 3,431,857                                                                March 11, 1969

Lyston C. Jennings et al.

It is certified that error appears in the above identified patent and that said Letters Patent are hereby corrected as shown below:

In the heading to the printed specification, line 6, "New Jersey" should read -- New York --.

Signed and sealed this 31st day of March 1970.

(SEAL)
Attest:

Edward M. Fletcher, Jr.                                  WILLIAM E. SCHUYLER, JR.
Attesting Officer                                                  Commissioner of Patents